United States Patent
Barrow et al.

(10) Patent No.: US 11,028,962 B1
(45) Date of Patent: Jun. 8, 2021

(54) COLLAPSING JACK STAND

(71) Applicants: Wesley Barrow, Owasso, OK (US); Ronald J. LaPelle, Tulsa, OK (US)

(72) Inventors: Wesley Barrow, Owasso, OK (US); Ronald J. LaPelle, Tulsa, OK (US)

(*) Notice: Subject to any disclaimer, the term of this patent is extended or adjusted under 35 U.S.C. 154(b) by 0 days.

(21) Appl. No.: 16/013,820

(22) Filed: Jun. 20, 2018

Related U.S. Application Data

(60) Provisional application No. 62/522,151, filed on Jun. 20, 2017.

(51) Int. Cl.
*F16M 11/00* (2006.01)
*F16M 11/20* (2006.01)
*F16M 11/04* (2006.01)

(52) U.S. Cl.
CPC ....... *F16M 11/2021* (2013.01); *F16M 11/046* (2013.01); *F16M 2200/028* (2013.01)

(58) Field of Classification Search
CPC .... B66F 7/08; B66F 3/00; B66F 7/085; B66F 7/10
USPC .......... 248/157, 161, 165, 166; 254/8 B, 126
See application file for complete search history.

(56) References Cited

U.S. PATENT DOCUMENTS

| | | | | |
|---|---|---|---|---|
| 1,661,882 A | * | 3/1928 | Derrick | B66F 3/005 |
| | | | | 187/208 |
| 2,921,763 A | * | 1/1960 | Miller | A47F 7/24 |
| | | | | 248/121 |
| D656,289 S | * | 3/2012 | Crump | D34/31 |
| D776,394 S | * | 1/2017 | Crump | D34/31 |
| 2014/0306084 A1 | * | 10/2014 | Klinzmann | F16M 11/046 |
| | | | | 248/423 |
| 2016/0223129 A1 | * | 8/2016 | Crump | B60T 3/00 |

* cited by examiner

*Primary Examiner* — Steven M Marsh
(74) *Attorney, Agent, or Firm* — Fellers, Snider, Blankenship, Bailey & Tippens, P.C.; Terry L. Watt

(57) ABSTRACT

The present invention relates to a collapsing jack stand for lifting off road vehicles, heavy equipment, boats, recreational vehicles, trailers, etc. The invention has a saddle for receiving an axel of a piece of equipment that is to be lifted by the stand. The saddle is adjustable in height and is supported above the ground by an upright member mounted on a base, with a brace member helping to support the upright member on the base. The collapsing jack stand is designed to be pivoted downward and folded into a flattened configuration when not in use, making it easy to store in a limited space. Only one bolt must be removed to collapse the jack stand.

9 Claims, 3 Drawing Sheets

COLLAPSING JACK STAND

CROSS-REFERENCE TO RELATED APPLICATIONS

This application claims priority to U.S. provisional application Ser. No. 62/522,151, entitled COLLAPSING JACK STAND, filed Jun. 20, 2017, the entirety of which is incorporated herein by reference.

BACKGROUND OF THE INVENTION

1. Field of the Invention

The present invention relates to a collapsing jack stand for lifting off road vehicles, heavy equipment, boats, recreational vehicles, trailers, etc. The invention is designed to be pivoted downward and folded into a flattened configuration when not in use by removing only one bolt from the jack stand.

2. Description of the Related Art

Jack stands generally have an adjustable height saddle for receiving therein an axel of a piece of equipment that is to be raised upon the jack. To support the saddle, the stands will have an upright tube member and a base upon which the upright tube member is supported on the ground. Also, the upright tube member will generally be provided with a brace member that helps to support the tube member on the base.

The problem with these types of jack stands is that they take up a large amount of space when not in use, and therefore, are not easily stored in a recreational vehicle or other area where storage space is limited.

The present invention addresses this problem by providing a jack stand that is collapsible and can be collapsed by removing only one upright tube bolt from the stand. The upright tube bolt secures the bottom of the upright tube to the base. When the upright tube bolt is removed, the upright tube and the attached axel saddle pivot downward toward the brace tube and the brace tube pivots downward toward the base, allowing the stand to assume a flattened configuration for storage.

SUMMARY OF THE INVENTION

The present invention is a collapsing jack stand for lifting vehicles or other similar equipment. The stand is provided with an adjustable height saddle for receiving therein an axel of a piece of equipment that is to be raised upon the jack stand. The saddle is supported on an upper end of an upright tube, and a lower end of the upright tube is secured to a base via an upright tube bolt. The height of the saddle can be adjusted by a height adjusting bolt that passes through aligned holes provided in the upright tube and also in a telescoping lower tube portion of the saddle. The base is designed to rest on the ground and is provided with nose spikes and a sand bar on the front end of the base to provide added traction.

The upright tube is provided with a brace tube that helps to support the tube member on the base. One end of the brace tube pivotally attaches by an upper brace bolt to an upper brace bracket provided on a rear side of the upright tube. An opposite end of the brace tube pivotally attaches by a lower brace bolt to a lower brace bracket provide on the rear end of the base.

The jack stand is collapsible and can be collapsed by removing only the upright tube bolt from the stand. The upright tube bolt functions to secure the bottom of the upright tube to the base. When the upright tube bolt is removed, the upright tube and the attached axel saddle pivot downward toward the brace tube at the upper brace bolt and the brace tube pivots downward toward the base at the lower brace bolt. This allows the stand to assume a flattened configuration for storage.

DETAILED DESCRIPTION OF THE PREFERRED EMBODIMENT

Figure 1:
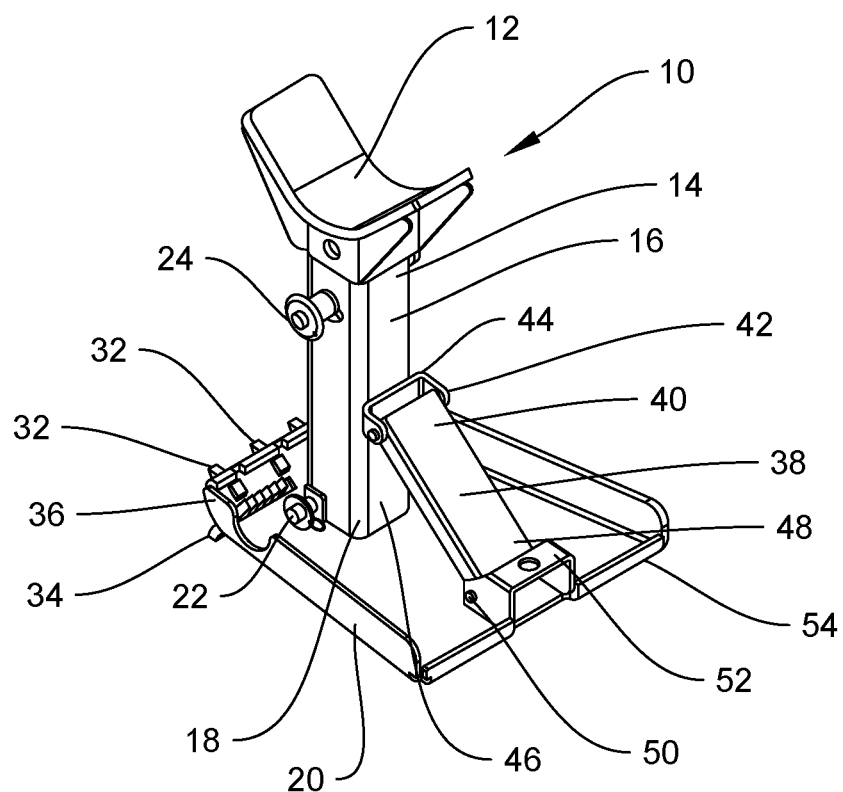
FIG. 1 is rear perspective view of a collapsing jack stand that is constructed in accordance with a preferred embodiment of the present invention.
Figure 2:
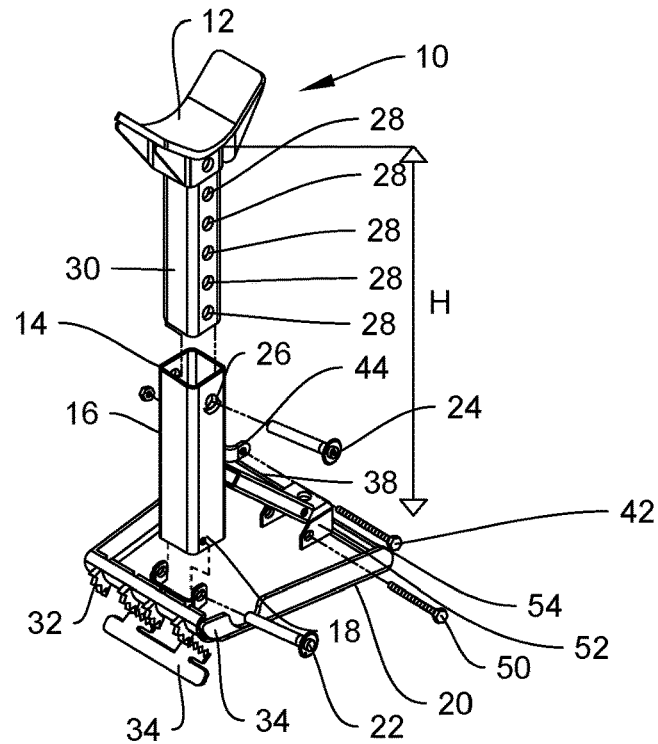
FIG. 2 is an exploded right front perspective view of the collapsing jack stand of FIG. 1.
Figure 3:
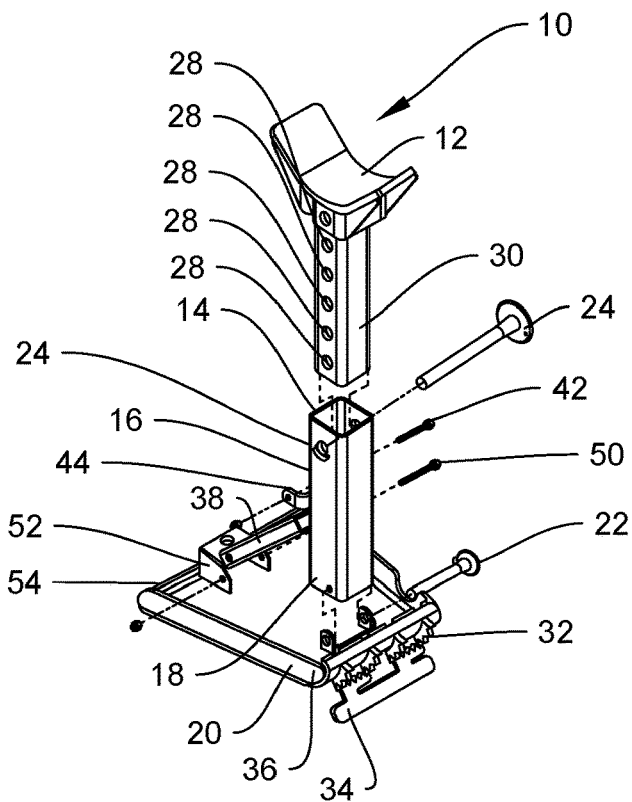
FIG. 3 is a left front perspective view of the collapsing jack stand of FIG. 2.

Referring now to the drawings and initially to FIGS. 1-3, there is illustrated a collapsing jack stand 10 that is constructed in accordance with a preferred embodiment of the present invention. The collapsing jack stand 10 is used for lifting vehicles or other similar equipment.

The stand 10 is provided with an adjustable height saddle 12 for receiving therein an axel of a piece of equipment that is to be raised upon the jack stand 10. The saddle 12 is supported on an upper end 14 of an upright tube 16, and a lower end 18 of the upright tube 16 is secured to a base 20 via an upright tube bolt 22. As shown in FIGS. 2 and 3, the height H of the saddle 12 above the base 20 can be adjusted by a height adjusting bolt 24 that passes through a pair of aligned holes 26 provided in the upright tube 16 and also through aligned holes 28 provided in a telescoping lower tube portion 30 of the saddle 12. The base 20 is designed to rest on the ground and is provided with nose spikes 32 and a sand bar 34 on the front end 36 of the base 20 to provide added traction and stability.

The upright tube 16 is provided with a brace tube 38 that helps to support the upright tube 16 on the base 20. A first end 40 of the brace tube 38 pivotally attaches by an upper brace bolt 42 to an upper brace bracket 44 provided on a rear side 46 of the upright tube 16. An opposite second end 48 of the brace tube 38 pivotally attaches by a lower brace bolt 50 to a lower brace bracket 52 provide on a rear end 54 of the base 20.

Figure 4:
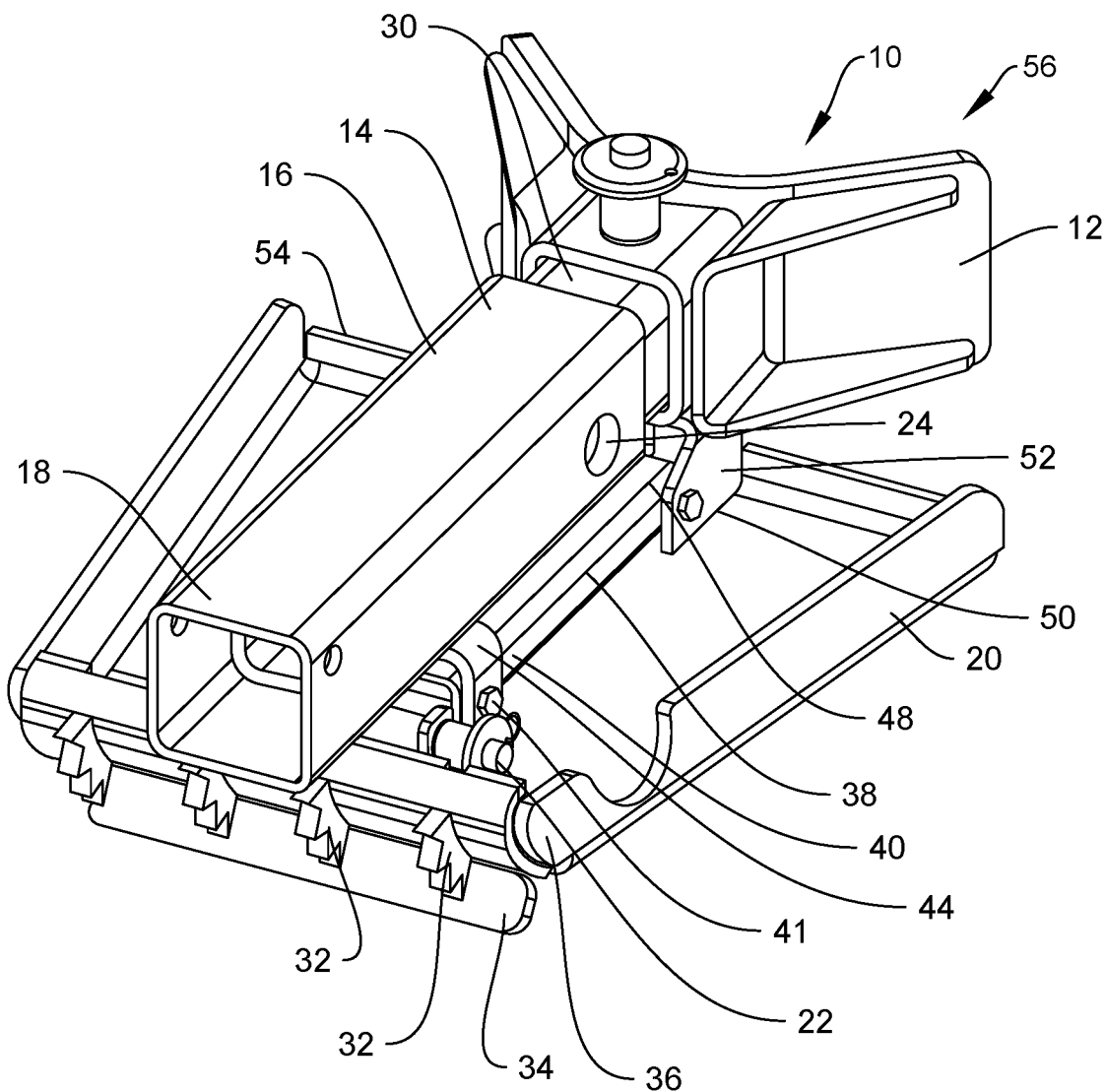
FIG. 4 is an enlarged front perspective view of the collapsing jack stand of FIG. 1 shown in its collapsed, flattened configuration.

As illustrated in FIG. 4, the jack stand 10 is collapsible and can be collapsed by removing only the upright tube bolt 22 from the stand 10. The upright tube bolt 22 functions to secure the lower end 18 the upright tube 16 to the base 20. When the upright tube bolt 22 is removed, the upright tube 16 and the attached axel saddle 12 pivots downward at the upper brace bolt 42 toward the brace tube 38, and the brace tube 38 pivots downward at the lower brace bolt 50 toward the base 20. As shown in FIG. 4, this allows the stand 10 to assume a flattened configuration 56 for storage.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

We claim:

1. A collapsible jack stand for lifting vehicles and equipment, the jack stand comprising:
   (a) a base;
   (b) an adjustable height saddle for receiving therein an axel of a piece of equipment that is to be raised upon the jack stand;
   (c) an upright tube forming aligned holes and having an upper end for supporting the saddle and a lower end secured to the base via an upright tube bolt,
      said upright tube bolt maintaining said upright tube in a vertical orientation only so long as said upright tube is secured to said base by said upright tube bolt;
   (d) a height adjusting bolt that passes through the aligned holes formed in the upright tube;
   (e) a telescoping lower tube extending from the adjustable height saddle, wherein the height of the saddle can be adjusted by the height adjusting bolt that passes through aligned holes formed in the upright tube and also in the telescoping lower tube; and
   (f) a brace tube for supporting the upright tube on the base, the brace tube having an upper first end and a lower second end, wherein:
      (1) the upper first end of the brace tube pivotally attaches by an upper brace bolt to an upper brace bracket provided on a rear side of the upright tube;
      (2) the lower second end of the brace tube pivotally attaches by a lower brace bolt to a lower brace bracket provided on the rear end of the base; and
      (3) the jack stand may be collapsed by removing the upright tube bolt from the aligned hole in the upright tube.

2. The jack stand of claim 1 wherein the base further comprises spikes.

3. The jack stand of claim 1 wherein the base further comprises a sand bar to provide added traction.

4. The jack stand of claim 1 wherein the upright tube bolt functions to secure the bottom of the upright tube to the base.

5. The jack stand of claim 4 wherein, when the upright tube bolt is removed, the upright tube and the adjustable height saddle pivot downward toward the brace tube at the upper brace bolt and the brace tube pivots downward toward the base at the lower brace bolt, allowing the stand to assume a flattened configuration for storage.

6. A collapsible jack stand for supporting vehicles and equipment, the jack stand comprising:
   (a) a base, said base having a top containing a brace bracket;
   (b) a brace tube pivotally attached to said base at a first end;
   (c) an upright tube pivotally attached to said brace tube at a second end of said brace tube, said upright tube pivotable between a horizontal and a vertical orientation,
      said upright tube having an upper end and a lower end,
      said upper end of said upright tube having a pair of aligned height adjusting holes, and,
      said lower end of said upright tube having a pair of aligned locking holes;
   (d) a telescoping tube having a lower end sized to be slideable within said upright tube, said telescoping tube lower having a lower end with a plurality of pairs of aligned adjusting holes;
   (e) a saddle affixed to an upper end of said telescoping tube;
   (f) a height adjusting bolt sized to be passed through said pair of height adjusting holes in said upright tube and through one of said plurality of pairs of adjusting holes in said telescoping tube, thereby locking said saddle at a predetermined height above said upright tube; and
   (g) an upright tube bolt sized to pass through said aligned locking holes, said upright tube bolt
      engaging said brace bracket and locking said upright tube in a vertical orientation when said upright tube is pivoted into said vertical orientation and said upright tube bolt is passed through said aligned locking holes, and,
      allowing said upright tube to be rotated into said horizontal position for storage when said upright tube bolt is not engaged with said base bracket.

7. The collapsible jack stand according to claim 6, wherein said pivotal attachment of said upright tube to said brace tube comprises:
   (c1) an upper brace bracket attached to said upright tube, said upper brace bracket being pivotally attached to said brace tube by an upper brace bolt.

8. The jack stand of claim 6 wherein the base further comprises a plurality of spikes situated on a lower surface of said base.

9. The jack stand of claim 6 wherein the base further comprises a sand bar to provide added traction.

* * * * *